US012792147B2

(12) United States Patent
Deixler et al.

(10) Patent No.: US 12,792,147 B2
(45) Date of Patent: Nov. 10, 2026

(54) BRAIN CONTROL INTERFACE SYSTEM FOR CONTROLLING A CONTROLLABLE DEVICE

(71) Applicant: SIGNIFY HOLDING B.V., Eindhoven (NL)

(72) Inventors: Peter Deixler, Arlington, MA (US); Evren Özcan, Eindhoven (NL); Jérôme Eduard Maes, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/729,909

(22) PCT Filed: Jan. 13, 2023

(86) PCT No.: PCT/EP2023/050775
§ 371 (c)(1),
(2) Date: Jul. 18, 2024

(87) PCT Pub. No.: WO2023/139001
PCT Pub. Date: Jul. 27, 2023

(65) Prior Publication Data

US 2025/0103135 A1 Mar. 27, 2025

Related U.S. Application Data

(60) Provisional application No. 63/300,765, filed on Jan. 19, 2022.

(30) Foreign Application Priority Data

Jan. 28, 2022 (EP) .................................... 22153808

(51) Int. Cl.
*G06F 3/01* (2006.01)
*H04W 4/02* (2018.01)
(Continued)

(52) U.S. Cl.
CPC ............ *G06F 3/015* (2013.01); *H04W 4/025* (2013.01); *H05B 47/11* (2020.01); *H05B 47/196* (2024.01)

(58) Field of Classification Search
CPC ........ G06F 3/015; H04W 4/025; H05B 47/11; H05B 47/196
See application file for complete search history.

(56) References Cited

U.S. PATENT DOCUMENTS 10,551,921 B2 * 2/2020 Ramer ..................... A61B 5/24
11,461,991 B2 * 10/2022 Troisi ..................... G06V 20/70
(Continued)

FOREIGN PATENT DOCUMENTS

CN 110123313 A 8/2019
CN 118575585 A * 8/2024
(Continued)

OTHER PUBLICATIONS

Falk, Tiago H., et al., "Improving the Performance of NIRS-Based Brain-Computer Interfaces in the Presence of Background Auditory Distractions," Published in IEEE International Conference on Acoustics, Speech and Signal Processing, IEEE, Mar. 2010 (4 Pages).

*Primary Examiner* — William Lu

(57) ABSTRACT

A brain control interface system for controlling a controllable device located in an environment is disclosed. The brain control interface system comprising: a brain control interface configured to detect brain activity of a user indicative of a control command for controlling the controllable device, and to derive the control command from the brain activity, a sensor configured to detect changes of an environmental characteristic in the environment, a processor configured to: determine if there is a temporal correlation between a detected change of the environmental characteristic and the detected brain activity of the user, and if the temporal correlation is not present, control the controllable
(Continued)

100 device according to the control command, if the temporal correlation is present, refrain from controlling the controllable device according to the control command.

20 Claims, 4 Drawing Sheets

(51) Int. Cl.
*H05B 47/11* (2020.01)
*H05B 47/175* (2020.01)

(56) References Cited

U.S. PATENT DOCUMENTS

| | | | | |
|---|---|---|---|---|
| 11,513,596 | B2 * | 11/2022 | Mallinson | G06N 3/044 |
| 2004/0263337 | A1 * | 12/2004 | Terauchi | G06F 3/015 340/573.1 |
| 2007/0173733 | A1 * | 7/2007 | Le | A61B 5/165 600/544 |
| 2009/0012402 | A1 * | 1/2009 | Mintz | A61B 5/0008 600/473 |
| 2013/0063550 | A1 * | 3/2013 | Ritchey | A61B 5/7246 345/207 |
| 2015/0324692 | A1 * | 11/2015 | Ritchey | G06N 20/00 348/36 |
| 2016/0077547 | A1 * | 3/2016 | Aimone | A61B 5/6814 345/8 |
| 2016/0096270 | A1 * | 4/2016 | Ibarz Gabardos | B25J 9/0081 901/3 |
| 2016/0239084 | A1 * | 8/2016 | Connor | A61B 5/6803 |
| 2019/0000384 | A1 * | 1/2019 | Gupta | A61B 5/4538 |
| 2019/0011978 | A1 * | 1/2019 | Ravindran | G06F 3/012 |
| 2019/0113973 | A1 * | 4/2019 | Coleman | H04L 12/16 |
| 2019/0192083 | A1 * | 6/2019 | Laszlo | A61B 5/369 |
| 2019/0196585 | A1 * | 6/2019 | Laszlo | A61B 5/38 |
| 2019/0387998 | A1 * | 12/2019 | Garten | A61M 21/00 |
| 2020/0324126 | A1 * | 10/2020 | Winstrom | A61N 1/37229 |
| 2020/0337625 | A1 * | 10/2020 | Aimone | A61B 5/7267 |
| 2020/0390358 | A1 * | 12/2020 | Johnson | A61B 5/6803 |
| 2021/0244329 | A1 * | 8/2021 | Ledbetter | A61B 5/245 |
| 2022/0151504 | A1 * | 5/2022 | Tzvieli | A61B 5/1103 |
| 2022/0273233 | A1 * | 9/2022 | Johnson | G16H 20/70 |
| 2022/0280084 | A1 * | 9/2022 | Johnson | G16H 20/70 |
| 2023/0093444 | A1 * | 3/2023 | Zander | G06F 3/013 706/12 |
| 2023/0172522 | A1 * | 6/2023 | Simeral | A61B 5/375 600/544 |

FOREIGN PATENT DOCUMENTS

| | | | | |
|---|---|---|---|---|
| DE | 102018221271 A1 | | 6/2020 | |
| KR | 20210030325 A | | 3/2021 | |
| KR | 20220098026 A | * | 7/2022 | G06F 3/015 |
| WO | WO-2012009117 A1 | * | 1/2012 | A61B 5/378 |
| WO | WO-2017040417 A1 | * | 3/2017 | G09B 5/06 |
| WO | WO-2020111962 A1 | * | 6/2020 | G06F 3/01 |
| WO | 2021019088 A1 | | 2/2021 | |
| WO | WO-2023138992 A1 | * | 7/2023 | H05B 47/196 |

* cited by examiner

100

BRAIN CONTROL INTERFACE SYSTEM FOR CONTROLLING A CONTROLLABLE DEVICE

CROSS-REFERENCE TO PRIOR APPLICATIONS

This application is the U.S. National Phase application under 35 U.S.C. § 371 of International Application No. PCT/EP2023/050775, filed on Jan. 13, 2023, which claims the benefit of U.S. Provisional Patent Application No. 63/300,765, filed on Jan. 19, 2022 and European Patent Application Ser. No. 22/153,808.5, filed on Jan. 28, 2022. These applications are hereby incorporated by reference herein.

FIELD OF THE INVENTION

The invention relates to a brain control interface system for controlling a controllable device. The invention further relates to a method of controlling a lighting device and to a computer program product for executing the method.

BACKGROUND

Brainwave-based device control is a rising new technology. A brain-computer-interface (BCI) is used to detect brain signals of a user, whereupon information from these brain signals is derived. This information may, for example, be indicative of a thought, a mental state (e.g. happy, relaxed, concentrated, neutral) or an action of the user. The thought may, for example, be indicative of a control command for a controllable device, such as a lighting device. An example of such as system is disclosed in U.S. Pat. No. 10,551,921B2. There are two main types of BCIs: non-invasive and invasive BCIs. The non-invasive versions are the most common, and comprise sensors (electrodes) placed on the human head. These measure brain activity and translate that data to a computer. Most BCIs utilize electroencephalography (EEG) systems, which typically feature electrodes are attached to the scalp, which measure the electrical current sent by the neurons inside the brain. Changes in this electrical current reflect brain activity, because when an individual performs an action or thinks about something, hundreds of thousands of neurons are fired. This generates the electrical current, which is large enough to be measured on the scalp. A computer system then tries to make sense of this data to derive the user's action or thought. Alternatives to EEG systems are electrooculography (EOG), electromyography (EMG), electrodermal activity (EDA) and photoplethysmography (PPG) systems. As alternative to utilizing electrodes on the surface of the scalp, implantable brain-computer interfaces may be used. Here, probes are inserted into the brain through an automated process performed by a surgical robot. Each probe comprises an area of wires that contains electrodes capable of locating electrical signals in the brain, and a sensory area where the wire interacts with an electronic system that allows amplification and acquisition of brain signals.

US 2019387998 A1 discloses a system and method may be provided for associating bio-signal data (e.g. EEG brain scan data) from at least one user with at least one music data item (e.g. song, or piece of music). By associating bio-signal data, or emotions determined therefrom, with music, the system may establish a data store of music associated with emotions. That database may then be leveraged upon determining that a user is feeling a particular emotion through an EEG scan. When a particular emotion is detected in EEG data of a user, the system may then respond based at least partly on the same or similar emotion being associated with one or more music data items in the system. For example, the system may recommend a particular song associated with the same emotion presently being experienced by the user.

SUMMARY OF THE INVENTION

The inventors have realized that external stimuli may affect the brain activity of a user, and that such an external stimulus may be interpreted by a BCI as a control command for a controllable device. For instance, when the lighting in an area changes, the user may recognize this change and render corresponding brain activity, which may be interpreted by a brain control interface as a control command to change the output of the light based on the control command. This may result in undesired control of the lighting in the area. It is therefore an object of the present invention to reduce the chance of false positives in brain control interfaces.

According to a first aspect, the object is achieved by a brain control interface system for controlling a controllable device located in an environment, the brain control interface system comprising:

- a brain control interface configured to detect brain activity of a user indicative of a control command for controlling the controllable device, and to derive the control command from the brain activity,
- a sensor configured to detect changes of an environmental characteristic in the environment,
- a processor configured to:
- determine if there is a temporal correlation between a detected change of the environmental characteristic and the detected brain activity of the user, and
- if the temporal correlation is not present, control the controllable device according to the control command,
- if the temporal correlation is present, refrain from controlling the controllable device according to the control command.

The brain control interface may be configured to analyze the brain activity of the user and derive a control command from the brain activity. It may, however, occur that the brain control command is accidentally detected because the user has observed a change of the environmental characteristic (e.g. the environmental light level, the environmental temperature, an environmental sound, an airflow, the environmental humidity etc.). This would result in that the detected change of the environmental characteristic and the detected brain activity of the user would be (substantially) simultaneously. The processor may thus determine if a temporal correlation between a detected change of the environmental characteristic and the detected brain activity of the user is present. If there is a temporal correlation between the detected brain control command (as determined by the brain control interface) and a detected external stimulus (i.e. change of the environmental characteristic), the brain control command is disregarded. If no temporal correlation is present, the controllable device is controlled according to the control command. By determining the presence of the temporal correlation, and controlling/refrain from controlling the controllable device accordingly, the chance of detecting false brain control commands (false positives) is reduced and the accuracy of the brain control interface system is improved.

The processor may be configured to determine if the detected change of the environmental characteristic exceeds a threshold, and to refrain from controlling the controllable device according to the control command only if the environmental characteristic exceeds the threshold. The processor may be further configured to, if the detected change of the environmental characteristic does not exceed the threshold, control the controllable device according to the control command. If the change of the environmental characteristic is not substantive, the control command may be determined as a genuine control command, and the controllable device may be controlled accordingly. This reduces the chance of detecting false negatives caused by at least the features of the brain control interface system, thereby further improving the accuracy of the brain control interface system.

The processor may be configured to determine the presence of the temporal correlation between the detected change of the environmental characteristic and the detected brain activity of the user by determining if the detected change of the environmental characteristic and the detected brain activity of the user occur within a predetermined time window. The predetermined time window may be less than 1 second. Depending on the application of the brain control interface system, the predetermined time window may for example be less than 500 ms, or even less than 200 ms. Optionally, the processor may be l configured to determine the rate of change of the environmental parameter. If the rate of change of the environmental parameter (e.g. light) is above a certain rate threshold (such as when abruptly switching on the light within 100 ms), the controllable device may be controlled according to the control command. If the rate of change of the environmental parameter (e.g. light) is below a certain rate threshold (gently fading in the light within 3 s from off the 100% light output), the controllable device may not be controlled according to the control command.

The processor may be further configured to determine a presence of a second correlation between the type of environmental characteristic and the detected brain activity of the user, and, if the temporal correlation is not present and the second correlation is present, control the controllable device according to the control command, if the second correlation is not present and the temporal correlation is present, control the controllable device according to the control command, if the temporal correlation and the second correlation are not present, control the controllable device according to the control command, if the temporal correlation and the second correlation are present, refrain from controlling the controllable device according to the control command. The processor may obtain data indicative of the type of environmental characteristic and a type of detected brain activity of the user. There may be a correlation between the type of the environmental characteristic and the control command. The processor may determine the presence of the second correlation by determining that the given control command is related to the environmental characteristic. For instance, the control command may be related to lighting control, and the environmental characteristic may be the light level in the environment. The processor may determine that the second correlation is present based thereon. In another example, the control command may be related to lighting control, and the environmental characteristic may be the environmental temperature. The processor may determine that the second correlation is not present based thereon.

The processor may be further configured to: when the processor has refrained from controlling the controllable device according to the control command, request a user operating the brain control interface system to control the controllable device based on the control command, and when the user has approved the request via a user interface, control the controllable device according to the control command, and when the user has disapproved the request via the user interface, again refrain from controlling the controllable device according to the control command. The processor may thus request/prompt the user to confirm or disconfirm that the controllable device is to be controlled or not. The user response may be used to teach the processor when to control or refrain from controlling the controllable device. The user response may, for instance, be used to train the brain control interface system, for instance to determine the above-mentioned threshold for the detected change of the environmental characteristic (which when exceeded results in refraining from controlling the controllable device according to the control command).

The processor may be further configured to control a further device when the temporal correlation is present, wherein the control of the further device is based on the brain activity as a response to the detected change of the environmental characteristic. The further device may be the device that caused the change of the environmental characteristic. The processor may be configured to determine which further device (of a plurality of further devices) has caused the change of the environmental characteristic, for instance based on sensor data from the sensor or based on a further signal received from the further device. For instance, when an environmental light level changes, the processor may determine that a light source in the environment caused this change, and control the light output of the light source based on the brain activity of the user (the manner in which the user responded to the change of the environmental characteristic, e.g. the user wanting to override the automated change of light with a brainwave command).

The sensor may be a light sensor, and the environmental characteristic may be the environmental light level. The sensor may be a temperature sensor, and the environmental characteristic may be the environmental temperature. The sensor may be an audio sensor, and the environmental characteristic may be environmental audio. The sensor may be a humidity sensor, and the environmental characteristic may be the environmental humidity.

The sensor may comprise multiple sensors each configured to detect a change of a respective different environmental characteristic, and the processor may be configured to determine if a plurality of changes of a plurality of environmental characteristics have occurred (substantially) simultaneously, and determine the presence of the temporal correlation between the plurality of changes and the detected brain activity of the user.

The brain control interface and the sensor may be comprised in a brain control interface device. This is beneficial because the brain control interface and the sensor are co-located, and the sensor is located at the location of the user operating (wearing) the brain control interface.

Alternatively, the sensor may be comprised in a separate device, and the processor may be configured to obtain information about the distance between the sensor and the brain control interface (e.g. from a positioning system, based on signal characteristics communicated between the sensor and the brain control interface, etc.), and determine whether to control or refrain from controlling the controllable device further based on the distance between the sensor and the brain control interface. If the distance exceeds a threshold, the processor may determine to control the controllable device according to the control command, even if the temporal correlation is present. If the distance does not exceed the threshold and the temporal correlation is present, the processor may determine to refrain from controlling the controllable device according to the control command.

The processor may be further configured to: obtain first data indicative of the location of the change of the environmental characteristic, obtain second data indicative of the location of the user, determine, based on the location of the change of the environmental characteristic and the location of the user, if the change of the environmental characteristic occurred within a predefined proximity of the user, and, if the change of the environmental characteristic has occurred outside the predefined proximity and if the temporal correlation is present, control the controllable device according to the control command. This is beneficial because if the change of the environmental characteristic has occurred outside the predefined proximity of the user and the temporal correlation is present, the control command is executed, which reduces the chance of false negatives.

Additionally, the second data may be further indicative of an orientation of the user, and the processor may be further configured to: determine, based on the location of the change of the environmental characteristic and the orientation of the user, if the change of the environmental characteristic occurred within a field of view of the user, and, if the change of the environmental characteristic has occurred outside the field of view of the user and if the temporal correlation is present, control the controllable device according to the control command. This is beneficial because by taking the orientation of the user into account the chance of false negatives is further reduced.

The controllable device may be a lighting device. Alternatively, the controllable device may, for example, be a connected (home) appliance or connected (office) equipment.

According to a second aspect, the object is achieved by a method of controlling a controllable device located in an environment, the method comprising:

- detecting, by a brain control interface, brain activity of a user indicative of a control command for controlling the controllable device,
- deriving the control command from the brain activity,
- detecting, by a sensor, changes of an environmental characteristic in the environment,
- determining, by a processor, if there is a temporal correlation between a detected change of the environmental characteristic and the detected brain activity of the user, and
- if the temporal correlation is not present, controlling the controllable device according to the control command,
- if the temporal correlation is present, refraining from controlling the controllable device according to the control command.

According to a third aspect, the object is achieved by a computer program product for a computing device, the computer program product comprising computer program code to perform the method when the computer program product is run on a processing unit of the computing device, the computing device comprising a brain control interface, a sensor and a processor.

It should be understood that the computer program product and the method may have similar and/or identical embodiments and advantages as the above-mentioned system.

BRIEF DESCRIPTION OF THE DRAWINGS

The above, as well as additional objects, features and advantages of the disclosed systems, devices and methods will be better understood through the following illustrative and non-limiting detailed description of embodiments of devices and methods, with reference to the appended drawings, in which.

All the figures are schematic, not necessarily to scale, and generally only show parts which are necessary in order to elucidate the invention, wherein other parts may be omitted or merely suggested.

DETAILED DESCRIPTION

Figure 1:
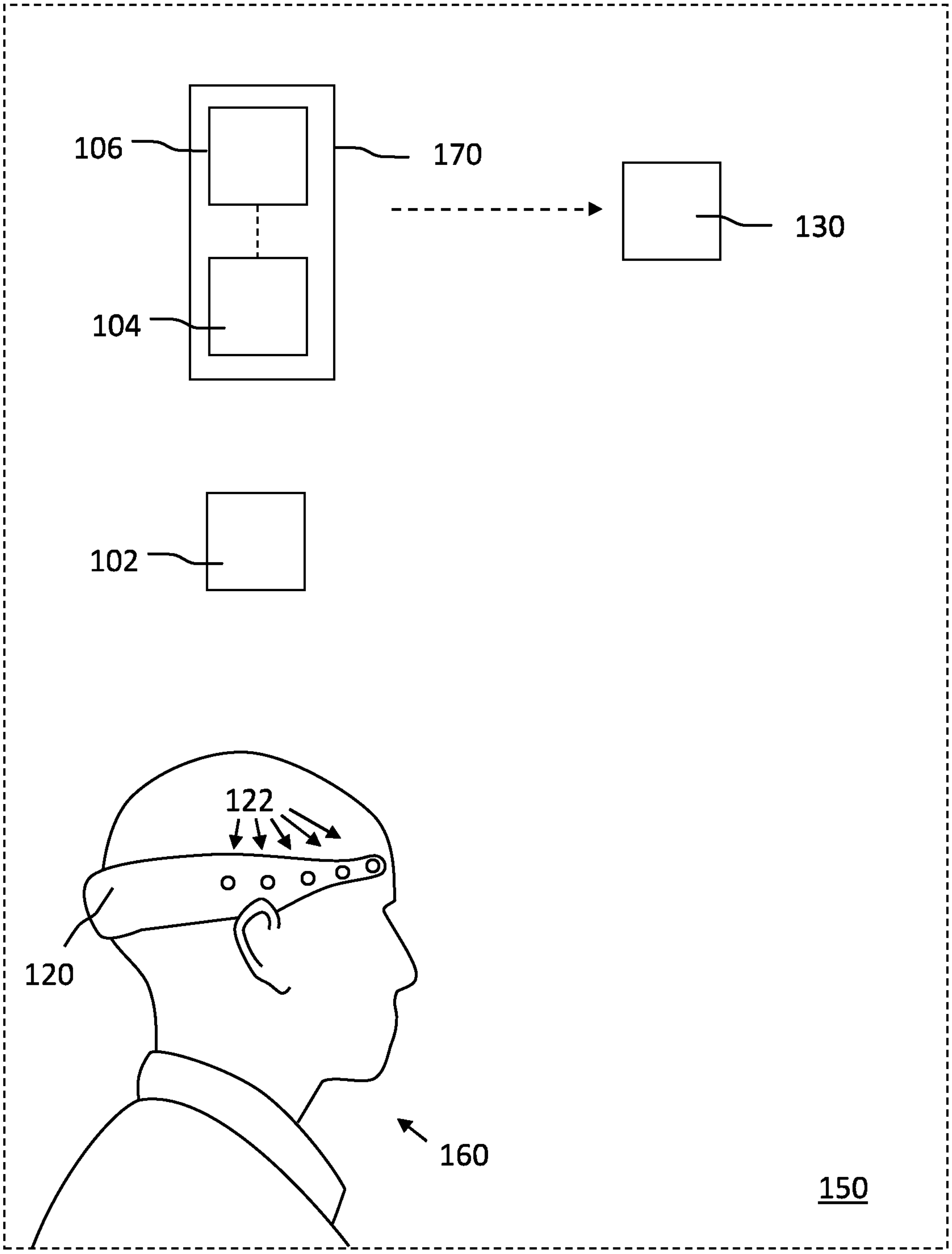
FIG. 1 shows schematically an example of a brain control interface system for controlling a controllable device.

FIG. 1 shows schematically an overview of a brain control interface system 100. The brain control interface system 100 comprises a brain control interface 120 (e.g. a head-worn device). The brain control interface 120 (BCI) is configured to detect brain signals indicative of brain activity of a user 160 in an environment 150. The BCI 120 may comprise one or more electrodes 122 in contact with the user's scalp, which electrodes 122 are used for detecting EEG signals of the user. It should be understood that such a BCI 120 is an example, and that other types of brain signal detection may be used. The system 100 further comprises a sensor 102 configured to detect (current/actual) changes of an environmental characteristic in the environment. The system 100 further comprises one or more processors 106 configured to determine if there is a temporal correlation between a detected change of the environmental characteristic and the detected brain activity of the user. The processor 106 is configured to, if the temporal correlation is not present, control a controllable device 130 according to a control command derived from the brain activity of the user 160. The processor 106 is further configured to, if the temporal correlation is present, refrain from controlling the controllable device 130 according to the control command.

The processor 106 is configured to control the controllable device 130. The processor 106 may be configured to control the controllable device 130 according to the control command by communicating control signals to the controllable device 130 (e.g. via Zigbee, BLE, Ethernet, etc.). The processor 106 may be comprised in the controllable device 130, and control the controllable device 130 directly. Alternatively, the processor 106 may be comprised in a remote device 170, or for example in the BCI 120, and the processor 106 may control the controllable device via a communication unit 104 configured to communicate the control signals to the controllable device 130.

The processor 106 may be comprised in a single device or distributed across multiple devices, which may depend on the system architecture of the BCI system 100. For instance, in the example of FIG. 1, the one or more processors 106 and the input 102 are comprised in a single device 170, which device 170 is communicatively coupled with the BCI 120 and the controllable device 130. It should be understood that this system architecture is merely an example, and that the skilled person is able to design alternative system architectures without departing from the scope of the appended claims. For instance, a first processor 106 may be comprised in the BCI 120, and a second processor 106 on a remote server or in the controllable device 130. In another example, the processor may be comprised in the BCI 120, in the controllable device 130, in a sensor device comprising the sensor 102, etc.

The system 100 comprises a brain control interface configured to detect brain activity of a user indicative of a control command for controlling the controllable device 130, and to derive the control command from the brain activity. The controllable device 130 may be a device configured to adjust an environmental characteristic that corresponds to the environmental characteristic detected by the sensor. The controllable device 130 may, for example, be a connected (home) appliance or connected (office) equipment. The controllable device 130 may comprise a receiver configured to receive control signals indicative of the control command, for instance via a wireless network. The controllable device 130 may, for example, be a connected speaker, a lighting device comprising one or more LED light sources, a thermostat, a tv, a (tablet) pc, a smartphone, a game console, etc.

The sensor 102 is configured to detect changes of an environmental characteristic in the environment. The sensor 102 may for example be a light sensor, and the environmental characteristic may be the environmental light level. The sensor 102 may for example be a temperature sensor, and the environmental characteristic may be the environmental temperature. The sensor 102 may for example be an audio sensor, and the environmental characteristic may be environmental audio. The sensor 102 may for example be a humidity sensor, and the environmental characteristic may be the environmental humidity. The sensor 102 may comprise multiple sensors each configured to detect a change of a respective different environmental characteristic.

The processor 106 is configured to determine if there is a temporal correlation between a detected change of the environmental characteristic (as detected by the sensor 102) and the detected brain activity of the user 160. The processor 106 may be configured to determine the presence of the temporal correlation between the detected change of the environmental characteristic and the detected brain activity of the user by determining if the detected change of the environmental characteristic and the detected brain activity of the user occur at substantially the same time or at least within a predetermined time window. The predetermined time window may be less than 1 second. Depending on the application of the brain control interface system, the predetermined time window may for example be less than 500 ms, or even less than 200 ms. For instance, the sensor 102 may be a light sensor and the controllable device 130 may be a lighting device. The lighting device may be configured to receive control signals from the processor 106 and comprise driver configured to adjust the light output of one or more (LED) light sources accordingly. The sensor 102 may detect a change in light level (e.g. due to switching on of a device such display, due to the sun appearing from behind the clouds, due to blinds opening, etc.) or a change in color (e.g. due to a display changing from red to blue, due to an automated change in color temperature of the ceiling lights). If the brain control interface 120 detects brain activity indicative of a control command for the controllable device 130 (e.g. a control command to switch the light on) at substantially the same time, the processor 106 may determine that there is a temporal correlation between the detected change of the environmental characteristic (the light level) and the detected brain activity of the user 160. If the temporal correlation is present, the processor 106 refrains from controlling the controllable device 130 according to the control command. If the temporal correlation is not present, the processor 106 controls the controllable device 130 according to the control command (e.g. the control command to switch the lighting device on).

Figure 2A:
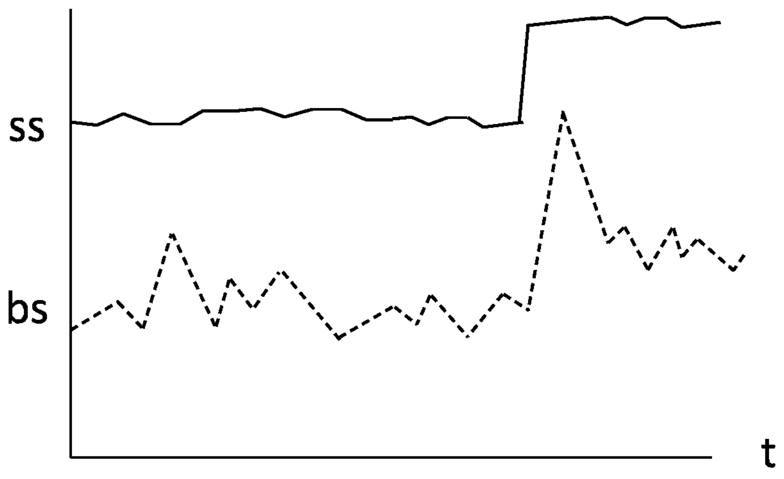
FIG. 2*a* shows schematically an example of a sensor signal and brain activity wherein a temporal correlation is present between the sensor signal and the brain activity.
Figure 2B:
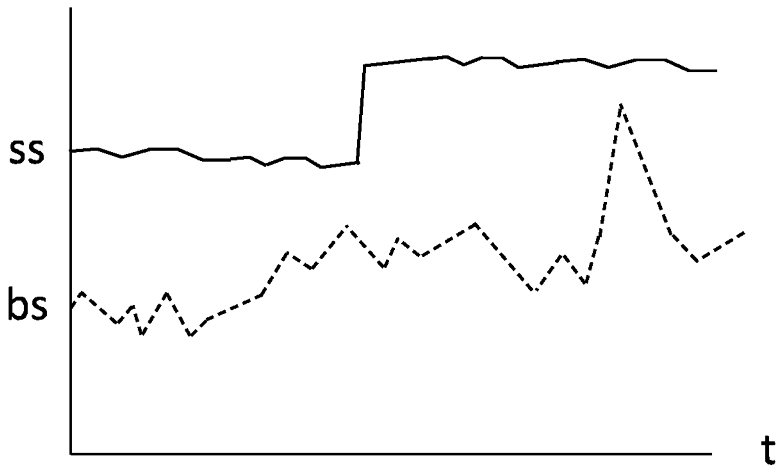
FIG. 2*b* shows schematically an example of a sensor signal and brain activity wherein no temporal correlation is present between the sensor signal and the brain activity.

FIGS. 2*a* and 2*b* show schematically examples of sensor signals ss (indicative of sensor readings of the sensor 102) and brain signals bs (indicative of the brain activity of the user 160) over time t. The brain signals bs are illustrated as a single line. This may, for example, correspond to the signal provided by a single electrode. It should be understood that multiple of such signals may be detected by different electrodes, and that the schematical examples provided in FIGS. 2*a* and 2*b* are provided for illustrative purposes. In FIG. 2*a* the increase of the sensor signal ss (i.e. the change of the environmental characteristic) and the peak in the brain signal bs (i.e. the brain activity indicative of the control command for the controllable device 130) occur substantially simultaneously. The processor 106 may thus determine that there is a temporal correlation between the between a detected change of the environmental characteristic and the detected brain activity of the user 160. The processor 106 may therefore refrain from controlling the controllable device 130 according to the control command. Alternatively, the detected change may be inverse. Hence, the increase of the sensor signal as depicted in FIG. 2*a* may be a similar shaped decrease of the sensor signal, which occurs substantially simultaneously with the peak in the brain signal. The sensor may then also detect a change of the environmental characteristic. The processor may also in such alternative situations determine that there is a temporal correlation between the detected change of the environmental characteristic and the detected brain activity of the user. In case of a gradual transition of the environmental characteristic (e.g. ceiling light fading in within 200 ms from off to 50% and then within 800 ms from 50% to 100%), the temporal correlation between the timeseries detected change of the environmental characteristic and the timeseries detected brain activity of the user will be analyzed. In FIG. 2*b* the increase of the sensor signal ss (i.e. the change of the environmental characteristic) and the peak in the brain signal bs (i.e. the brain activity indicative of the control command for the controllable device 130) at different times (e.g. outside a predetermined time window). The processor 106 may thus determine that there is no temporal correlation between the between a detected change of the environmental characteristic and the detected brain activity of the user 160. The processor 106 may therefore control the controllable device 130 according to the control command.

Figure 2C:
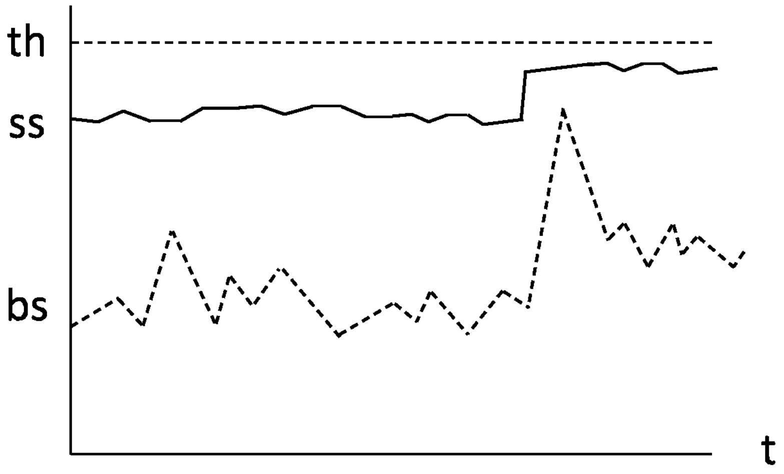
FIG. 2*c* shows schematically an example of a sensor signal and its threshold, and brain activity.

The processor 106 may be configured to determine if the detected change of the environmental characteristic exceeds a threshold, and to refrain from controlling the controllable device 130 according to the control command only if the environmental characteristic exceeds the threshold. The processor 106 may be further configured to, if the detected change of the environmental characteristic does not exceed the threshold, control the controllable device 130 according to the control command. FIG. 2*c* illustrates an example wherein the detected change of the environmental characteristic (signal ss) does not exceed a threshold th. The processor 106 may determine there is a temporal correlation between the between a detected change of the environmental characteristic and the detected brain activity of the user 160. So initially the processor 106 would refrain from controlling the controllable device 130 according to the control command, but since the change of the environmental characteristic (signal ss) does not exceed a threshold th, the processor 106 may control the controllable device 130 according to the control command. In examples, the threshold may be a threshold range, having an upper threshold limit and a lower threshold limit, wherein the signal does not exceed the threshold if the signal remains within said threshold range (i.e. between the lower and upper threshold limit).

The processor 106 may be further configured to determine a presence of a second correlation between the type of environmental characteristic and the (type of) detected brain activity of the user. The processor 106 may thus determine if the type of the environmental characteristic detected by the sensor 102 corresponds to an environmental characteristic that is to be changed by the brain activity. The controllable device 130 may be a device configured to adjust an environmental characteristic that corresponds to the environmental characteristic detected by the sensor 102. The processor 106 may be further configured to control the controllable device according to the control command if the temporal correlation is not present and the second correlation is present. The processor 106 may be further configured to control the controllable device according to the control command if the second correlation is not present and the temporal correlation is present. The processor 106 may be further configured to control the controllable device according to the control command if the temporal correlation and the second correlation are not present. The processor 106 may be further configured to refrain from controlling the controllable device according to the control command if the temporal correlation and the second correlation are present. For instance, if the environmental characteristic is of a first type (e.g. a light level in the environment) and the brain activity (and therewith the control command) is of a correlated type (e.g. a lighting control command), the processor 106 may determine that the second correlation is present. For instance, if the environmental characteristic is of a first type (e.g. a light level in the environment) and the brain activity (and therewith the control command) is of a non-correlated type (e.g. an audio control command), the processor 106 may determine that the second correlation is not present. For instance, if the environmental characteristic is of a first type (e.g. a temperature in the environment) and the brain activity (and therewith the control command) is of a correlated type (e.g. a color temperature of the light control command), the processor 106 may determine that the second correlation is present. The processor 106 may be configured to access a (local or remote) memory configured to store correlations between types of environmental characteristics and respective (types of) brain activities (and therewith (types of) control commands) of the user, and to determine the presence of the second correlation between the type of environmental characteristic and the (type of) detected brain activity of the user based on the stored correlations.

The processor 106 may be further configured to request the user 160 operating the brain control interface system 100 to control the controllable device 130 based on the control command when the processor 106 has refrained from controlling the controllable device according to the control command. The user 160 may then approve or disapprove the request via a user interface (e.g. a voice assistant, a touch screen, one or more buttons on a switch, etc.). The processor 106 may be communicatively coupled (e.g. wirelessly, directly) to the user interface. When the user 160 has approved the request via the user interface, the processor 106 may control the controllable device 130 according to the control command, and when the user has disapproved the request via the user interface, the processor 106 may again refrain from controlling the controllable device 130 according to the control command.

The processor 106 may be further configured to control a further device when the temporal correlation is present, wherein the control of the further device is based on the brain activity as a response to the detected change of the environmental characteristic. The processor 106 may be configured to communicate with the further device in a similar manner as with the controllable device 130. The further device may be the device that caused the change of the environmental characteristic. The processor 106 may be configured to determine which further device (of a plurality of further devices) has caused the change of the environmental characteristic, for instance based on sensor data from the sensor or based on a signal received from the further device. For instance, when an environmental light level changes, the processor 106 may determine that a light source in the environment caused this change, and control the light output of the light source based on the brain activity of the user (the manner in which the user responded to the change of the environmental characteristic).

The processor 106 may be further configured to determine whether to control the controllable device 130 further based on the location of the change of the environmental characteristic. The processor 106 may be configured to obtain first data indicative of the location of the change of the environmental characteristic. The processor 106 may, for example, obtain information about the location and/or orientation of the sensor 102 relative to the environment 150, and determine the location of the change of the environmental characteristic based thereon. This has been illustrated in FIG. 3*a*, wherein the location of the sensor 302*a*, and therewith the location of the change of the environmental characteristic 304*a* may be obtained by the processor 106. Alternatively, the sensor 102 may be configured to detect the location of the change of the environmental characteristic, and communicate this location to the processor 106. This has been illustrated in FIG. 3*a*, wherein the sensor 302*b* (e.g. a camera, a thermopile camera, an audio sensor, etc.) may have a field of view 312*b*, and the sensor 302*b* may be configured to determine the location of the change of the environmental characteristic 304*b* in its field of view 312*b* based on sensor signals (e.g. based on an image of the environment, based on the signal strength of the sensor signals, etc.), and determine the location of the change of the environmental characteristic relative to the environment based on the sensor's 302*b* location relative to the environment. The location of the sensor 102, 302*a*, 302*b*, 302*c* may be determined based on data from an (indoor) positioning system. Examples of such a positioning system include a radio frequency (RF) beacon system, a coded light positioning system, etc. Alternatively, the location of the sensor 102, 302*a*, 302*b*, 302*c* may have been defined by the user via a user interface. It should be understood that techniques for determining a location of a sensor/device are known in the art and will therefore not be discussed in detail.

Figure 3A:
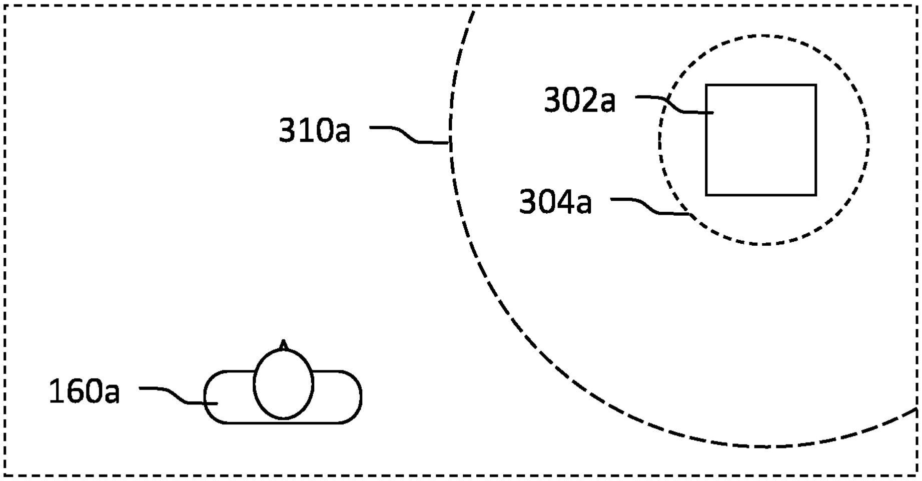
FIGS. 3*a*-3*c* show schematically various examples of determining a location of a user with respect to an environmental change.
Figure 3B:
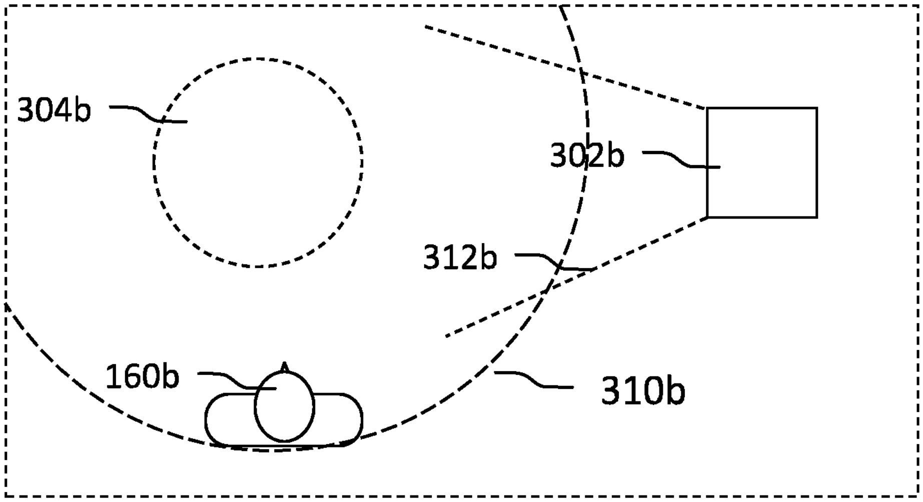

The processor 106 may be further configured to obtain second data indicative of the location of the user 160 relative to the environment 150 or relative to the sensor 102. The second data may be obtained from an (indoor) positioning system. Examples of such a positioning system include a radio frequency (RF) beacon system, a coded light positioning system, etc. Alternatively, the location of the user 160 may have been defined by the user 160 via a user interface. It should be understood that techniques for determining a location of a user relative to an environment 150 are known in the art and will therefore not be discussed in detail. The processor 106 may be further configured to determine, based on the location of the change of the environmental characteristic and the location of the user, if the change of the environmental characteristic occurred within a predefined proximity of the user. If the change of the environmental characteristic has occurred outside the predefined proximity and if the temporal correlation is present, control the controllable device according to the control command. The predefined proximity may, for example, be defined as a distance, or be defined as an area (e.g. a (part of) a room in the environment 150). FIGS. 3*a* and 3*b* show examples of environments. In the example of FIG. 3*a*, the user 160*a* is located outside predefined proximity range 310*a*. The processor 106 may therefore control-even if there is a temporal correlation between a detected change of the environmental characteristic and the detected brain activity of the user—the controllable device 130 according to the control command, for instance because the detected change of the environmental characteristic may be imperceivable by the user. In the example of FIG. 3*b*, the user 160*b* is located inside predefined proximity range 310*b*. The processor 106 may therefore refrain from controlling the controllable device 130 according to the control command, because the detected change of the environmental characteristic may be perceivable by the user.

Figure 3C:
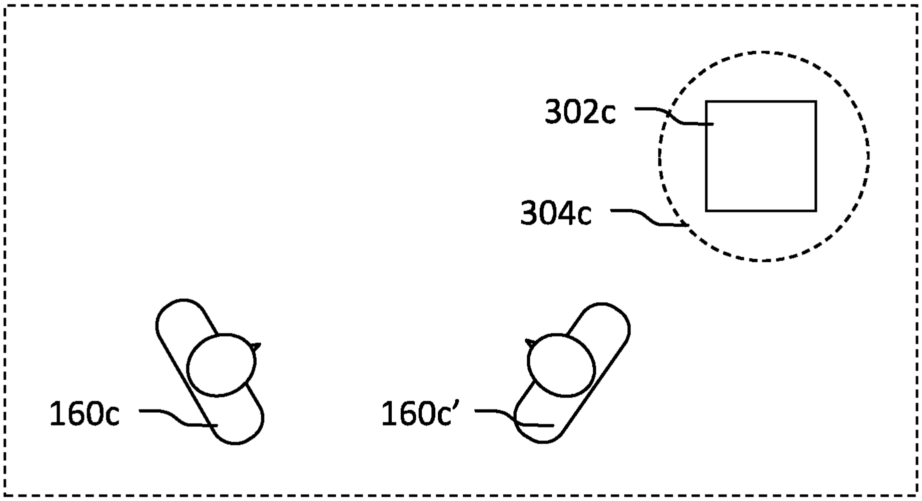

The second data may be further indicative of an orientation of the user 160. The orientation may be obtained from an orientation sensor (e.g. from a magnetometer comprised in a user-worn or held device, from a remote camera, etc.) or the orientation of the user 160 may have been defined by the user via a user interface. The processor 106 may be further configured to determine whether to control the controllable device 130 further based on the orientation of the user relative to the change of the environmental characteristic. The processor 106 may be further configured to determine, based on the location of the change of the environmental characteristic and the orientation of the user, if the change of the environmental characteristic occurred within a field of view (FoV) of the user 160. If the change of the environmental characteristic has occurred outside the field of view of the user 160 and if the temporal correlation is present, control the controllable device 130 according to the control command. FIG. 3*c* shows two user-locations 160*c* and 160*c*'. If the user would be located at location 160*c*, the processor 106 may determine that the change of the environmental characteristic (e.g. the environmental light level) has occurred within the FoV of the user 160*c*, and therefore determine to refrain from controlling the controllable device 130 based on the control command. If the user would be located at location 160*c*', the processor 106 may determine that the change of the environmental characteristic (e.g. the environmental light level) has occurred outside the FoV of the user 160*c*', and therefore determine to control the controllable device 130 based on the control command, because the detected change of the environmental characteristic may be imperceivable by the user.

Figure 4:
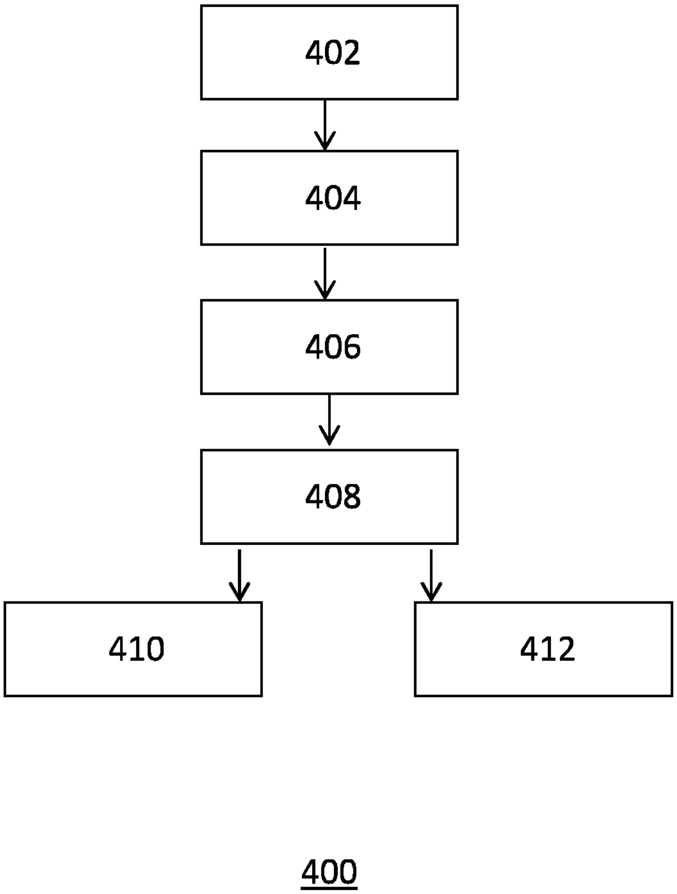
FIG. 4 shows schematically a method of controlling a controllable device located in an environment.

FIG. 4 shows schematically a method 400 of controlling a controllable device located in an environment. The method comprises: detecting 402, by a brain control interface, brain activity of a user indicative of a control command for controlling the controllable device, deriving 404 the control command from the brain activity, detecting 406, by a sensor, changes of an environmental characteristic in the environment, determining 408, by a processor, if there is a temporal correlation between a detected change of the environmental characteristic and the detected brain activity of the user, and, if the temporal correlation is not present, controlling 410 the controllable device according to the control command, if the temporal correlation is present, refraining 412 from controlling the controllable device according to the control command.

The method 400 may be executed by computer program code of a computer program product when the computer program product is run on a computing system, such as the system 100.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors or even the 'cloud'.

Storage media suitable for storing computer program instructions include all forms of nonvolatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet.

The invention claimed is:

1. A brain control interface system for controlling a controllable device located in an environment, the brain control interface system comprising:

a brain control interface configured to detect brain activity of a user indicative of a control command for controlling the controllable device, and to derive the control command from the brain activity, a sensor configured to detect changes of an external stimulus in the environment, and a processor configured to:

determine if there is a temporal correlation between a detected change of the external stimulus and the detected brain activity of the user from which the control command is derived, the temporal correlation being indicative of the control command having been inadvertently derived from brain activity rendered by the user in response to perceiving the detected change of the external stimulus, and if the temporal correlation is not present, control the controllable device according to the control command, or if the temporal correlation is present, refrain from controlling the controllable device according to the control command by disregarding the control command.

2. The brain control interface system of claim 1, wherein the processor is configured to determine if the detected change of the external stimulus exceeds a threshold, and to refrain from controlling the controllable device according to the control command only if the external stimulus exceeds the threshold.

3. The brain control interface system of claim 1, wherein the processor is configured to determine the presence of the temporal correlation between the detected change of the external stimulus and the detected brain activity of the user by determining if the detected change of the external stimulus and the detected brain activity of the user occur within a predetermined time window.

4. The brain control interface system of claim 3, wherein the predetermined time window is less than 1 second.

5. The brain control interface system of claim 1, wherein the processor is further configured to determine a presence of a second correlation between the type of external stimulus and the control command, and, if the temporal correlation is not present and the second correlation is present, control the controllable device according to the control command, if the second correlation is not present and the temporal correlation is present, control the controllable device according to the control command, if the temporal correlation and the second correlation are not present, control the controllable device according to the control command, if the temporal correlation and the second correlation are present, refrain from controlling the controllable device according to the control command.

6. The brain control interface system of claim 1, wherein the processor is further configured to:

when the processor has refrained from controlling the controllable device according to the control command, request a user operating the brain control interface system to control the controllable device based on the control command, and when the user has approved the request via a user interface, control the controllable device according to the control command, and when the user has disapproved the request via the user interface, again refrain from controlling the controllable device according to the control command.

7. The brain control interface system of claim 1, wherein the processor is further configured to control a further device when the temporal correlation is present, wherein the control of the further device is based on the brain activity as a response to the detected change of the external stimulus.

8. The brain control interface system of claim 1, wherein the sensor is a light sensor, and wherein the external stimulus is the environmental light level.

9. The brain control interface system of claim 1, wherein the sensor is a temperature sensor, and wherein the external stimulus is the environmental temperature.

10. The brain control interface system of claim 1, wherein the brain control interface and the sensor are comprised in a brain control interface device.

11. The brain control interface system of claim 1, wherein the processor is further configured to:

obtain first data indicative of the location of the change of the external stimulus, obtain second data indicative of the location of the user, determine, based on the location of the change of the external stimulus and the location of the user, if the change of the external stimulus occurred within a predefined proximity of the user, and, if the change of the external stimulus has occurred outside the predefined proximity and if the temporal correlation is present, control the controllable device according to the control command.

12. The brain control interface system of claim 11, wherein the second data is further indicative of an orientation of the user, and wherein the processor is further configured to:

determine, based on the location of the change of the external stimulus and the orientation of the user, if the change of the external stimulus occurred within a field of view of the user, and, if the change of the external stimulus has occurred outside the field of view of the user and if the temporal correlation is present, control the controllable device according to the control command.

13. The brain control interface system of claim 1, wherein the controllable device is a lighting device.

14. The brain control interface system of claim 1, wherein the controllable device is further configured to adjust an environmental characteristic that corresponds to the external stimulus detected by the sensor.

15. The brain control interface system of claim 1, wherein the processor is further configured to determine the temporal correlation by analyzing a timeseries of the detected change of the external stimulus and a timeseries of the detected brain activity of the user.

16. The brain control interface system of claim 1, wherein the processor is further configured to determine a rate of change of the external stimulus, and to control the controllable device according to the control command if the rate of change of the external stimulus exceeds a rate threshold.

17. The brain control interface system of claim 1, wherein the sensor comprises multiple sensors, each of the multiple sensors configured to detect a change of a respective different environmental characteristic, and wherein the processor is further configured to determine when a plurality of changes of a plurality of environmental characteristics have occurred substantially simultaneously and to determine the presence of the temporal correlation between the plurality of changes and the detected brain activity of the user.

18. The brain control interface system of claim 1, wherein the sensor is located in a separate device, and wherein the processor is further configured to obtain information about a distance between the sensor and the brain control interface, and to control the controllable device according to the control command when the distance exceeds a threshold.

19. A method of controlling a controllable device located in an environment, the method comprising:

detecting, by a brain control interface, brain activity of a user indicative of a control command for controlling the controllable device, deriving the control command from the brain activity, detecting, by a sensor, changes of an external stimulus in the environment, determining, by a processor, if there is a temporal correlation between a detected change of the external stimulus and the detected brain activity of the user from which the control command is derived, the temporal correlation indicative of the control command having been inadvertently derived from brain activity rendered by the user in response to perceiving the detected change of the external stimulus, and if the temporal correlation is not present, controlling the controllable device according to the control command, or if the temporal correlation is present, refraining from controlling the controllable device according to the control command by disregarding the control command.

20. A non-transitory computer readable medium comprising computer executable instructions that, when executed, perform at least the method of claim 19 when run on a processor.

* * * * *